United States Patent [19]

Wong et al.

[11] Patent Number: 4,870,525
[45] Date of Patent: Sep. 26, 1989

[54] METHOD OF MOUNTING FLEXURE ARMS ON A CAST ROTARY ACTUATOR

[75] Inventors: Walter Wong, Longmont; John M. Embery, Lyons; Richard W. Morris, Broomfield, all of Colo.

[73] Assignee: MiniScribe Corporation, Longmont, Colo.

[21] Appl. No.: 190,578

[22] Filed: May 5, 1988

[51] Int. Cl.⁴ .............................................. G11B 5/53
[52] U.S. Cl. ..................................................... 360/137
[58] Field of Search ............... 360/104, 105, 106, 137; 72/57, 58, 370; 310/40 R; 429/450, 451, 602.1, 437, 507, 523

[56] References Cited

U.S. PATENT DOCUMENTS

| | | | |
|---|---|---|---|
| 4,707,754 | 11/1987 | Patel et al. | 360/106 |
| 4,754,353 | 6/1988 | Levy | 360/106 |

FOREIGN PATENT DOCUMENTS

| | | | |
|---|---|---|---|
| 0208280 | 1/1987 | European Pat. Off. | 360/106 |
| 3404231 | 8/1985 | Fed. Rep. of Germany | 360/106 |
| 0020908 | 2/1978 | Japan | 360/106 |

Primary Examiner—Stuart N. Hecker
Assistant Examiner—David J. Severin
Attorney, Agent, or Firm—Curtis, Morris & Safford

[57] ABSTRACT

A rotary actuator having at least two legs or arms extending from the distal end of a body containing a bore through which passes a shaft about which the body rotates. A frame extends from the opposite end of the body to support a flat coil which, when the actuator is assembled, cooperates with magnets to function as a rotary "voice coil". The entire structure (i.e. the legs, body and frame) is formed as a monolithic structure by casting aluminum or some other non-magnetic metal. Other manufacturing techniques may be used, such as investment casting, machining or extrusion. Hence, no assembly is needed to join the legs or the coil-support frame to the body. Flexure elements are secure to the legs and each flexure element has a hollow pin that is placed within an opening of a respective actuator leg. A ball is driven downwardly through each hollow pin to expand that pin laterally and thus wedge the flexure into firm contact with a mounting pad on the leg. The ball is driven through all the pin/pad holes in succession for a one-step mounting operation for the multi-arm actuator.

1 Claim, 1 Drawing Sheet

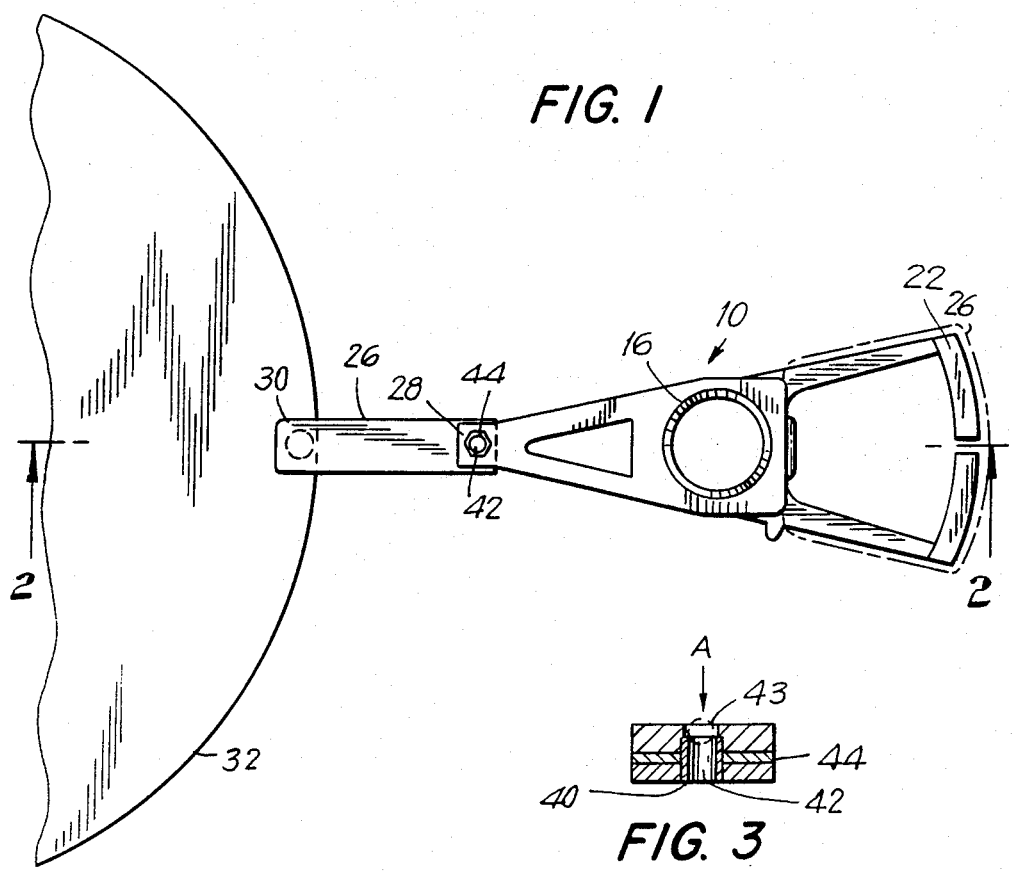
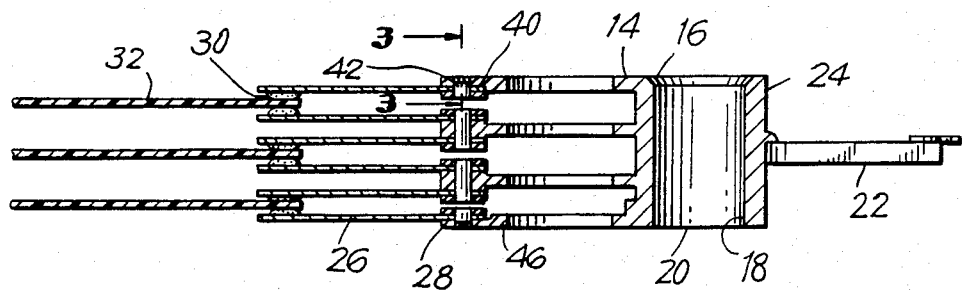

METHOD OF MOUNTING FLEXURE ARMS ON A CAST ROTARY ACTUATOR

BACKGROUND OF THE INVENTION

The invention relates to the field of rotary actuators for use in Winchester disk drives, and more particularly, to a one-piece cast rotary actuator used in a Winchester disk drive.

Rotary actuators for moving read/write heads from one track to another in Winchester disk drives are, of course, well-known. These prior art rotary actuators are formed by securing a leg assembly (consisting of several legs which might be a single unit) to a body. Other rotary actuators have been constructed by painstakingly mounting each individual leg portion onto the body. Examples of such prior art actuators are shown in U.S. Pat. Nos. 4,443,824, 4,430,679, 4,422,115, 4,346,416 and 4,107,748. In these prior art rotary actuators, the head-support legs are usually joined to a body by screws. Likewise, a coil support frame on which the actuator "motor" coil is supported also is joined to the body by screws. Hence, assembly is needed to join the legs or the coil-support frame to the body. Obviously, such an assemblage of the rotary actuator is extremely labor intensive.

In addition, with a single, multi-arm actuator, it is not possible to get screws onto the intermediate arms to secure the flexure elements to the arms of the actuator due to space constraints.

OBJECTS OF THE INVENTION

It is a general object of this invention to provide a rotary actuator used in a Winchester disk drive which is easy to manufacture.

It is another object of this invention to provide a one-piece cast rotary actuator used in a Winchester disk drive.

It is a further object of this invention to provide a multi-arm, one-piece cast rotary actuator wherein no assembly is needed to join the legs or the coil-support frame to the body.

It is yet another object of this invention to provide a multi-arm, one-piece cast rotary actuator which provides low inertia to the disk drive system.

It is still a further object of this invention to provide a multi-arm, one-piece cast rotary actuator which holds tolerances more accurately and provides for better heat dissipation.

It is still a further object of this invention to provide a cost-efficient fastening method wherein all the flexure elements of a disk drive may be secured to a corresponding leg of a multi-arm, one-piece cast rotary actuator in a one-step operation.

Other objects and advantages of the invention will become apparent from the following detailed description and from the appended drawings in which like numbers have been used to describe like parts of the several views.

SUMMARY OF THE INVENTION

The present invention relates generally to a rotary actuator used in a Winchester disk drive, and more specifically, to a one-piece cast rotary actuator used in a Winchester disk drive. This rotary actuator has at least two legs extending from the distal end of a body containing a bore through which passes a shaft about which the body rotates. A frame extends from the opposite end of the body to support a flat coil which, when the actuator is assembled, cooperates with magnets to function as a rotary "voice coil". The entire actuator structure (i.e. the body, legs and frame) is formed as one piece and made from a non-magnetic material. As such, no assembly is necessary to join the legs or the coil-support to the body.

Furthermore, as a result of the entire structure including the legs, body and frame being casted as a monolithic structure, it is possible to provide a cost-efficient fastening method called "staking" for securing each flexure element to a corresponding leg of the actuator assembly. With this design, each flexure element has a hollow pin that is placed within a hole of the actuator leg. A ball is driven through the hollow pin to expand that pin and thus wedge the flexure into firm contact with the mounting pad. The ball is driven through all of the pin/pad holes in succession for a one-step mounting operation.

BRIEF DESCRIPTION OF THE DRAWINGS

The following detailed description given by way of example but not intended to limit the present invention solely to the specific embodiments described, may best be understood in conjunction with the accompanying drawings in which:

FIG. 1 is a top elevational view of a preferred embodiment of the rotary actuator of the present invention;

FIG. 2 is a side elevational view taken along line 2—2 of FIG. 1; and

FIG. 3 is a cross-sectional view taken along line 3—3 of FIG. 2.

DETAILED DESCRIPTION OF THE PREFERRED EMBODIMENT

Referring now to FIG. 1, the present invention relates to a rotary actuator used in a Winchester disk drive. The rotary actuator 10 has at least two legs 12 (four legs are shown) extending from the distal end 14 of a body 16 containing a bore 18 through which passes a shaft 20 about which the body 16 rotates. A frame 22 extends from the opposite end (or proximal end) 24 of the body 16 to support a flat coil 26 (shown in broken lines), which when the actuator is assembled, cooperates with magnets to function as a rotary "voice coil". The entire structure including the legs, body and frame is formed as a monolithic structure by casting aluminum or some other non-magnetic metal. Conventional head flexures 26 are secured to the free ends 28 of the legs, and the usual HGA 30 is mounted on the ends of these flexures to record data on or read data from hard disks 32.

This one-piece construction of the rotary actuator provides for low inertia to the disk drive system. Furthermore, this rotary actuator also holds tolerances more accurately as there is no accumulation of tolerances from the different materials used in the prior art for the different elements of the actuator. Similarly, a monolithic structure for the rotary actuator provides far better heat dissipation as there are no heat interfaces between the different materials of the different elements of the prior art actuators.

As a result of the design of the preferred embodiment of the present invention, no assembly is needed to join the legs or the coil-support frame to the body, and is hence much less labor intensive than a rotary actuator wherein head-support arms are joined to the body by screws or other fastening means. It is therefore possible to provide a cost-efficient fastening method called "staking" for securing each flexure element to a corresponding leg of the actuator assembly.

As is best shown in FIGS. 2 and 3, each flexure element 26 has a hollow pin 40 that is placed within hole 42 of the corresponding actuator leg 12. A ball 43 is driven downwardly in the direction of arrow A (see FIG. 3) through each hollow pin 40 to expand that pin laterally and thus wedge the flexure into firm contact with mounting pad 44. The ball is driven through all of the pin/pad holes in succession for a one-step mounting operation of the multi-arm actuator. In the past, conventional tooling held the flexure in place on the pad while the ball was driven through its pin. The present configuration permits easy securement of the flexure elements in the intermediate arms.

While the present invention has been particularly shown and described with reference to a preferred embodiment, it will be readily appreciated by those of ordinary skill in the art the various changes and modifications may be made without departing from the spirit and scope of the invention. For instance, other manufacturing techniques may be utilized to achieve one-piece construction, such as, investment casting, machining or extrusion. Additionally, each flexure element can be adhesively bonded to its corresponding actuator leg. It is intended that the appended claims be interpreted as including the foregoing as well as various other changes and modifications.

I claim:

1. A method of securing a plurality of flexure elements to a corresponding mounting pad extending from a leg of a rotary actuator comprising:
   positioning a hollow pin of each flexure element within an orifice of a corresponding actuator leg; and
   driving a ball in succession through each hollow pin to expand each pin laterally and force the flexure into firm contact with the mounting pad to provide a one-step mounting operation.

* * * * *